United States Patent

Patton

[15] 3,645,824
[45] Feb. 29, 1972

[54] PROCESS FOR PROVIDING IMPROVED POLYVINYLIDENE CHLORIDE-COATED SUBSTRATES

[72] Inventor: Richard A. Patton, Prospect Heights, Ill.
[73] Assignee: Morton International, Inc.
[22] Filed: Oct. 29, 1968
[21] Appl. No.: 771,618

[52] U.S. Cl. .............................. 156/322, 156/117, 117/62
[51] Int. Cl. ............................................................C09j 5/00
[58] Field of Search .................... 156/310, 322, 326, 333; 117/62, 161, 72

[56] References Cited

UNITED STATES PATENTS

| | | |
|---|---|---|
| 3,240,648 | 3/1966 | Bradley..............................156/322 X |
| 3,249,482 | 5/1966 | Gilfillan..................................156/322 |
| 3,505,147 | 4/1970 | Eulie....................................156/322 X |
| 2,877,151 | 3/1959 | Doherty et al.......................156/322 X |

Primary Examiner—Carl D. Quarforth
Assistant Examiner—Stephen J. Lechert, Jr.
Attorney—Hofgren, Wegner, Allen, Stellman & McCord

[57] ABSTRACT

A method of retaining adhesion, reducing blocking, and increasing the solvent resistance of polyvinylidene chloride-coated substrates comprising coating a substrate with a solution or aqueous dispersion of a polyvinylidene chloride composition, removing the volatile matter therefrom, heating the coated substrate to a temperature of from about 100° to about 200° F., and maintaining the temperature of said coated substrate for a period of time ranging from about at least 20 hours for a temperature of about 100° F. to at least about 2 minutes for a temperature of about 200° F.

1 Claims, No Drawings

PROCESS FOR PROVIDING IMPROVED POLYVINYLIDENE CHLORIDE-COATED SUBSTRATES

BACKGROUND OF INVENTION

1. Field of the Invention

In general, this invention relates to an improvement in polyvinylidene chloride coatings for the flexible packaging art, and in particular to a process for maintaining adhesion between the coating and the substrate and developing maximum resistance to blocking and resistance to solvents and chemically active substances, e.g., tomato catsup, mustard, dressings, cosmetics, pharmaceuticals, etc. and the like.

2. Description of the Prior Art

It is generally recognized that vinylidene chloride interpolymer films and coatings are excellent barriers to transmission of moisture vapor, oxygen and other gases, and are resistant to attack by a large number of chemicals such as acids, oils and fats. They also have the added advantage of being heat sealable. These properties make vinylidene chloride copolymers valuable in the packaging industry as heat sealable, protective, barrier coatings for a variety of substrates such as paper, paperboard, aluminum foil, cellophane, polyethylene, nylon and the like. These copolymers are particularly useful for the protective coating of food containers and food packaging or wrapping materials where low permeability to gases and vapors is a requirement. For the purpose of imparting further heat seal properties, additional grease resistance and moisture barrier properties to packaging materials, olefin polymers such as polyethylene are used to overlay or coat the polyvinylidene chloride surface of the coated substrate to produce a laminate. Primers or adhesives which are conventionally employed to adhere polyethylene and other films to the polyvinylidene chloride surface are usually dissolved in a solvent or a solvent system and are applied to the polyvinylidene chloride surface. Prior to solvent contact, volatilization and removal, it is obviously important that the polyvinylidene chloride coating be impervious to or at least resistant to solvent attack.

The present practice for combining polyvinylidene chloride coated substrates with other packaging webs, e.g., polyethylene, comprises first applying a solvent based adhesive or primer to the polyvinylidene chloride surface. After removal of solvent, the prepared surface is combined with the other web by either conventional laminating or extrusion coating techniques. This conventional processing results in a reduction in bond strength between the polyvinylidene chloride and the substrate. In addition to loss of bond strength caused by solvent attack, a haze or whitening of the polyvinylidene chloride coating has also resulted, producing packages which are esthetically unattractive and commercially unsatisfactory. Another disadvantage inherent in the aforedescribed laminate is the absorption of the solvent of the adhesive by the polyvinylidene chloride coating prior to solvent evaporation. This results in the retention of undesirable odor thereby creating a serious problem in food packaging since in many instances the solvent odor is also absorbed by the packaged food.

Further, it is important that a coated, flexible packaging laminate material presents as little drag or resistance as possible if it is to run well on automatic packaging machinery such as, for example, a Bartelt pouch-making machine. It is generally recognized in the art that the friction of the coated substrate, as determined by the Kinetic Coefficient of Friction method, ASTM Method D1894–63, should have a value of 0.25 or less for satisfactory performance. However, the polyvinylidene chloride coatings of the prior art, immediately after coating, usually exhibit values of 0.4 to 0.5 depending on the particular copolymer combination used. It is only upon aging that the coefficient of friction of polyvinylidene chloride coated-substrates prepared in the conventional manner decreases to the desirable 0.25 level. Such aging, of course, is intolerable since it unnecessarily delays production.

Another disadvantage of the prior art is the sticking, referred to in the art as "blocking," of the polyvinylidene chloride coating to the uncoated reverse side of the substrate when the coated substrate is wound up into a roll. This makes it extremely difficult to unroll the material for further processing and possess a particular problem when the substrate is one which has a print coating on the reverse side in which case the blocking is more severe.

It has been a well established practice in the coating industry, prior to winding up a polyvinylidene chloride-coated substrate, to chill the coated substrate immediately after the substrate has been coated with polyvinylidene chloride and dried with high velocity hot air. For this purpose, the interposition of a "chill roll" on a polyvinylidene chloride coating line is common practice. The chill roll is composed of highly polished, water cooled rolls of stainless or chrome steel and is used for the express purpose of cooling the dried polyvinylidene chloride coated film prior to windup. It is commonly thought that the use of the chill roll to cool the laminate functions to prevent blocking. However, even with the use of the chill roll, blocking still remains a problem in the industry.

SUMMARY OF THE INVENTION

Surprisingly and contrary to the practice in the art, it was found that heating, rather than cooling, the polyvinylidene chloride film or coated substrate immediately after formation in the process of this invention provides a packaging material which overcomes the aforenoted defects.

This invention contemplates the enhancement of the properties of vinylidene chloride copolymer surfaces with respect to solvent resistance and reduction of surface tackiness. In one preferred aspect of the present invention relating to the provision of vinylidene chloride copolymer coated substrates, the following benefits are achieved: (1) prevention of undue loss of adhesion of the polyvinylidene chloride coating to a substrate, (2) reduction of the coefficient of friction of the polyvinylidene chloride coating to a desirable level, (3) reduction of the tendency of a polyvinylidene chloride coated substrate to block or stick to its own reverse side, (4) improvement of resistance to attack by solvents contained in adhesives or primers and prevention of the formation of haze, and (5) alleviation of the problem of the retention of solvent odor.

Accordingly, in one form, the process of the present invention comprises (1) coating a substrate with a polyvinylidene chloride composition contained in a volatile medium, (2) removing the volatile matter therefrom to form a continuous coating on said substrate, and heating the coated substrate to a temperature in the range of from about 100° to about 200° F. for at least about 2 minutes. For higher temperatures within this range, a time of about 2 minutes has been found adequate. For a temperature of about 100° F., a time of about 20 hours may be required to achieve the desired results.

Another form of the present invention comprises casting a self-supporting film of a polyvinylidene chloride copolymer composition either from a volatile medium such as a solvent or aqueous dispersion, removing volatile matter therefrom to form said film and heating said cast film to a temperature in the range of from about 100° to about 200° F. for at least about 2 minutes. For a temperature of about 100° F., a time of about 20 hours is adequate to achieve the desired results.

DESCRIPTION OF THE PREFERRED EMBODIMENT

Any of the flexible rigid, or semirigid packaging materials commonly used in the packaging art are suitable substrates in the practice of this invention. Thus, for example, Kraft paper, paperboard, glassine, aluminum sheet or foil, polyethylene or polypropylene film, regenerated cellulose, polyamide film, polyvinyl chloride film, polystyrene, cellulose acetate, and polyester film such as for example Mylar are but exemplary of the many substrates which may be coated with polyvinylidene chloride compositions according to the teachings of this invention.

Any of the conventionally used polyvinylidene chloride copolymer compositions may be employed to coat these substrates. These are usually copolymers produced by copolymerizing vinylidene chloride with one or more monomers selected from the group consisting of unsaturated acids and acrylic monomers such as acrylonitrile and acrylate esters. The finished copolymers usually contain at least about 50 weight percent of polymer units derived from vinylidene chloride, preferably more than about 80 weight percent of vinylidene chloride polymer units. One useful copolymer contains from about 88 to about 92 weight percent of polymer units derived from vinylidene chloride, from about 1 to about 4 weight percent of polymer units derived from acrylonitrile, and from about 5 to about 10 weight percent of polymer units derived from an acrylate monomer selected from the group consisting of methyl acrylate and ethyl acrylate. The compositions may be applied from either a solvent solution or from an aqueous dispersion. In one preferred embodiment of this invention, application is made from an aqueous dispersion.

As is readily understood, the relationships between temperature an time to produce coatings having freedom from blocking, retention of adhesion, and solvent resistance vary with the particular polyvinylidene chloride compositions employed. However, even for a particular composition, there are a number of different combinations of time and temperature within the aforementioned range at which the desired attributes will be achieved.

In one preferred embodiment of the present invention, nylon film is coated with an aqueous dispersion of a polyvinylidene chloride copolymer composition. Water is removed from the coating by force drying to provide nylon having a continuous film of polyvinylidene chloride composition thereon. The coated substrate is heated to a temperature of about 140° F. and maintained at that temperature for a period of time of about 45 minutes. This treatment renders the polyvinylidene chloride coating essentially solvent resistant, and free from blocking. Nylon thus coated may be used as is, or it may be further treated with a solvent based primer without exhibiting evidence of solvent attack and thereafter laminated to another suitable packaging web to form a tightly adherent structure.

For a more complete understanding of the process of the present invention reference is made to the following specific examples:

EXAMPLE 1

A. Polyethylene film, 2 mil. thick, commercially available from E. I. Du Pont De Nemours, under the trade name "ALATHON 200 A 102" was coated with a suitable solvent-based primer at a coating weight of 0.5 lb. of primer per 3,000 sq. feet of polyethylene. The primer coated polyethylene was the dried and subsequently coated with an aqueous dispersion of a polyvinylidene chloride copolymer composition made from, on a monomer weight basis, 91 percent vinylidene chloride, 7 percent methyl acrylate, and 2 percent acrylonitrile (hereinafter designated Coating Composition A), and dried to form a continuous film thereon. The coated polyethylene was then heated at a temperature of 80° F. up to a period of 63 days. After storage times of 1 day, 21 days, and 63 days. After storage times of 1 day, 21 days, and 63 days respectively at a temperature of 80° F., a solvent based-adhesive was applied to the vinylidene chloride surface, the solvent was evaporated and nylon film was bonded thereto by means of a conventional laminating technique.

The above procedure was repeated except that the temperature at which the coated polyethylene was heated was 130° F. and the time of storage prior to the application of the solvent based adhesive was 6 hours. In both instances, visual observations were made of solvent attack upon the polyvinylidene chloride coatings after the application and drying of the solvent-based adhesive. The results are summarized in Table 1 below.

B. The above procedure was repeated except that a polyvinylidene chloride copolymer composition made from, on a monomer weight basis, 88 percent vinylidene chloride, 8.5 percent ethyl acrylate and 3.5 percent acrylonitrile (hereinafter designated Coating Composition B) was employed. The results of visual observations of solvent attack are summarized in Table 1.

TABLE 1

| Coating Composition | Conditioning Time (Days) | Temp. (° F.) | Solvent Attack |
|---|---|---|---|
| A | 1 | 80° F. | Severe |
|   | 21 | 80° F. | Severe |
|   | 63 | 80° F. | None |
|   | 0.25 (6 hrs.) | 130° F. | None |
| B | 1 | 80° F. | Moderate |
|   | 21 | 80° F. | Moderate |
|   | 63 | 80° F. | Moderate |
|   | 0.25 (6 hrs.) | 130° F. | None |

This example illustrates that each of the different polyvinylidene chloride compositions required only 6 hours of conditioning at a temperature of 130° F. to achieve complete resistance to solvent attack, whereas at a temperature of 80° F. freedom from solvent attack is not achieved by Coating Composition A for a period of time greater than 21 days.

The difference in behavior between different polyvinylidene chloride copolymer compositions is illustrated by the fact that Coating Composition B did not attain complete solvent resistance even after 63 days conditioning at 80° F.

EXAMPLE 2

The procedure of Example 1 was repeated with both Coating Composition A and Coating Composition B except that 0.7 lb. of primer per 3,000 sq. feet of polyethylene was employed. After conditioning the coated substrates at 80° F as in Example 1 for a duration of 1, 21 and 63 days respectively, each of the conditioned structures was laminated to nylon film and the respective bond strengths were determined after one week at ambient temperature (72° F) and also after one week at 130° F in the following manner:

BOND STRENGTH TEST

Bond strengths were meas$red by the heat seal bond test. In this test the laminate is prepared as described above. The coated substrate is then folded in half and heat sealed, polyethylene surface to polyethylene surface, in a Sentinel heat sealer at 275° to 300° F. at one second dwell time and at 20 pounds per square inch jaw pressure. The heat sealed sheets are cut at right angles to the weld into one inch wide strips. The samples are then tested for bond strength by means of the Instron tensile tester. An Instron tensile tester is a device used in the packaging industry to determine bond strengths of various flexible wrapping laminates. This apparatus is equipped with a pair of clamps or jaws, one of which jaws is designed to grip one portion of the laminate and the other jaw the other portion. The lower jaw of the Instron tester is connected to a moving crosshead which is driven away from the upper jaw at a constant rate of speed. The upper jaw is connected to an electronic device which detects and records the load applied in units of weight and the force required to break a particular bond. The free ends of the samples are clamped in the Instron tensile tester and drawn apart at the rate of ten inches per minute. The force necessary to pull apart the specimens is then determined. The bond strengths are determined in units of grams per linear inch of weld. Bond strengths were measured on laminations prepared by using the polyvinylidene chloride coated polyethylene processed at the specified storage time and temperature and then successively coated with an adhesive and bonded to nylon. The results of the bond strength test are summarized in Table 2.

TABLE 2

| Coating Composition | CONDITIONING Time (Days) | Temp. (°F.) | Bond Strengths After 1 Week at Ambient Temp. (72° F.) | After 1 Week at 130° F. |
|---|---|---|---|---|
| A | 1 | R.T. (72° F.) | 200 | 200 |
|   | 21 | R.T. (72° F.) | 250 | 250 |
|   | 63 | R.T. (72° F.) | 500 | 575 |
|   | 0.25 (6 hrs.) | 130° F. | 500 | 550 |
| B | 1 | R.T. (72° F.) | 175 | 225 |
|   | 21 | R.T. (72° F.) | 300 | 350 |
|   | 63 | R.T. (72° F.) | 350 | 375 |
|   | 0.25 (6 hrs.) | 130° F. | 600 | 650 |

This example illustrates that each of the polyethylene substrates coated with different polyvinylidene chloride compositions required only 6 hours of conditioning at a temperature of 130° F. to attain maximum bond strength when subsequently laminated to nylon film, whereas at a temperature of 72° F. a greatly improved bond strength of the subsequent lamination is not attained until the polyethylene coated with Coating Composition A had been conditioned up to 63 days. The difference in behavior between the two different polyvinylidene chloride compositions is illustrated by the fact that Coating Composition B did not attain maximum bond strength upon subsequent lamination even though prior to lamination it had been conditioned at 72° F. for 63 days.

This further demonstrates the importance of conditioning the polyvinylidene chloride coated substrate prior to rather than after application of the solvent based adhesive for lamination purposes

EXAMPLE 3

Cast films were prepared from aqueous dispersions of Coating Composition A and a polyvinylidene chloride copolymer composition made from, on a monomer weight basis, 92 percent vinylidene chloride, 6 percent methyl acrylate and 2 percent acrylonitrile, hereinafter designated Coating Composition C, by applying the dispersion to a glass substrate, drying and peeling off the resulting film.

Samples of film cast from Coating Composition A were tested for solvent resistance after conditioning at temperatures of 80° F., 100° F., and 130° F. respectively for varying periods of time.

Samples of film cast from Coating Composition C were tested for solvent resistance after conditioning at temperatures of 80° F. and 100° F. respectively for varying periods of time.

Solvent resistance was determined by immersing the samples in acetone for 5 seconds. The extent of solvent attack was measured by visual observation. Using the number system indicated below, quantitative changes in the amount of solvent attacked were determined for the indicated storage times and temperatures.

4 - very severe
    3 - moderately severe
    2 - moderate
    1 -- slight
    0 - none The results of the above solvent resistance test are summarized in Table 3.

TABLE 3

Solvent Sensitivity of PVDC* Cast Films

| Coating Composition | Conditioning Time (Days) | Temperature ° F. | Solvent Attack |
|---|---|---|---|
| A | 7 | 80° F. | 4 |
|   | 10 | 80° F. | 3 |
|   | 14 | 80° F. | 2 |
|   | 0.8(19.2 hrs.) | 100° F. | 4 |
|   | 1.0 | 100° F. | 2 |
|   | 1.4 | 100° F. | 0 |
|   | 0.2(4.8 hrs.) | 130° F. | 3 |
|   | 0.4(9.6 hrs.) | 130° F. | 0 |
| C | 2 | 80° F. | 4 |
|   | 7 | 80° F. | 2 |
|   | 10 | 80° F. | 1 |
|   | 14 | 80° F. | 0 |
|   | 0.2(4.8 hrs.) | 100° F. | 4 |
|   | 0.6(14.4 hrs.) | 100° F. | 1 |
|   | 0.8(19.2 hrs.) | 100° F. | 0 |

*Polyvinylidene Chloride

Example 3 illustrates that complete resistance to solvent attack of polyvinylidene chloride composition coatings can be achieved in as little as 9.6 hours by maintaining the coating at a temperature of 130° F.

EXAMPLE 4

Nylon film commercially available under the trade name Capran 77 C was coated with Coating Composition A and then dried. The polyvinylidene chloride coated substrate was tested for solvent resistance after conditioning at the indicated temperatures and times set forth in Table 4 by immersion in acetone for 5 seconds.

The degree of solvent attack, indicated by film haze, was measured with a Beckman db. Spectrophotometer using as a standard a non-solvent treated sample at the same conditions of storage time and temperature. The absorbance was measured at a wave length of 5,500 A. The conditioning of the polyvinylidene chloride coated substrates was continued at the indicated various temperatures until an absorbance of 0 was reached indicating complete solvent resistance. The results of these tests are summarized in Table 4.

TABLE 4

| Coating Composition | Conditioning Time (Days) | Temperature ° F. | Absorbance |
|---|---|---|---|
| A | 0 | 72° F. | 2+ |
|   | 1 | 72° F. | 2+ |
|   | 2 | 72° F. | 2+ |
|   | 3 | 72° F. | 2+ |
|   | 4 | 72° F. | 2+ |
|   | 5 | 72° F. | 2+ |
|   | 7 | 72° F. | 2+ |
|   | 8 | 72° F. | 2+ |
|   | 9 | 72° F. | 2+ |
|   | 10 | 72° F. | 2+ |
|   | 11 | 72° F. | 2+ |
|   | 14 | 72° F. | 2+ |
|   | 21 | 72° F. | 2+ |
|   | 23 | 72° F. | 2+ |
|   | 25 | 72° F. | 2+ |
|   | 28 | 72° F. | 0.88 |
|   | 29 | 72° F. | 0.81 |
|   | 30 | 72° F. | 0.39 |
|   | 35 | 72° F. | 0.165 |
|   | 38 | 72° F. | 0.16 |
|   | 42 | 72° F. | 0.31 |
|   | 46 | 72° F. | 0.186 |
|   | 50 | 72° F. | 0.235 |
|   | 57 | 72° F. | 0.05 |
|   | 64 | 72° F. | 0.0 |

| Coating Composition | Conditioning Time (Hours) | Temperature °F. | Absorbance |
|---|---|---|---|
| B | 0 | 100° F. | 2+ |
|   | 8 | 100° F. | 2+ |
|   | 10 | 100° F. | 0.81 |
|   | 11 | 100° F. | 0.43 |
|   | 12 | 100° F. | 0.272 |
|   | 13 | 100° F. | 0.178 |
|   | 14 | 100° F. | 0.143 |
|   | 15 | 100° F. | 0.06 |
| B | 16 | 100° F. | 0.044 |
|   | 17 | 100° F. | 0.017 |
|   | 18 | 100° F. | 0.014 |
|   | 19 | 100° F. | 0.005 |
|   | 20 | 100° F. | 0.004 |
|   | 21 | 100° F. | 0.005 |
|   | 22 | 100° F. | 0.0 |

| Coating Composition | Conditioning Time (Minutes) | Temperature °F. | Absorbance |
|---|---|---|---|
| A | 0 | 140° F. | 2+ |
|   | 5 | 140° F. | 2+ |
|   | 15 | 140° F. | 2+ |
|   | 19 | 140° F. | 2+ |
|   | 22 | 140° F. | 1.1 |
|   | 25 | 140° F. | 0.64 |
|   | 30 | 140° F. | 0.20 |
|   | 35 | 140° F. | 0.05 |
|   | 40 | 140° F. | 0.14 |
|   | 45 | 140° F. | 0.0 |
| A | 0 | 180° F. | 2+ |
|   | 2 | 180° F. | 2+ |
|   | 3 | 180° F. | 2+ |
|   | 4 | 180° F. | 0.78 |
|   | 5 | 180° F. | 0.18 |
|   | 6 | 180° F. | 1.178 |
|   | 7 | 180° F. | 0.07 |
|   | 8 | 180° F. | 0.05 |
|   | 9 | 180° F. | 0.002 |
|   | 10 | 180° F. | 0.0 |
| A | 0 | 200° F. | 2+ |
|   | 2 | 200° F. | 2+ |
|   | 3 | 200° F. | 0.82 |
|   | 4 | 200° F. | 0.14 |
|   | 5 | 200° F. | 0.113 |
|   | 6 | 200° F. | 0.03 |
|   | 7 | 200° F. | 0.0 |
| A | 0 | 240° F. | 2+ |
|   | 1 | 240° F. | 2+ |
|   | 3 | 240° F. | 1.9 |
|   | 4 | 240° F. | 0.72 |
|   | 4.5 | 240° F. | 0.66 |
|   | 5 | 240° F. | 0.115 |
|   | 5.5 | 240° F. | 0.118 |
|   | 6 | 240° F. | 0.12 |
|   | 7 | 240° F. | 0.09 |
|   | 8 | 240° F. | 0.06 |
|   | 10 | 240° F. | 0.018 |
|   | 12 | 240° F. | 0.005 |
|   | 14 | 240° F. | 0.003 |
|   | 16 | 240° F. | 0.0 |
| A | 0 | 280° F. | 2+ |
|   | 3 | 280° F. | 2+ |
|   | 10 | 280° F. | 2+ |
|   | 25 | 280° F. | 2+ |
|   | 30 | 280° F. | 0.49 |
|   | 45 | 280° F. | 0.125 |
|   | 60 | 280° F. | 0.115 |
|   | 80 | 280° F. | 0.23 |
|   | 130 | 280° F. | 0.05 |
|   | 190 | 280° F. | 0.06 |

Note that by increasing the conditioning temperature from 72° F. to higher levels, the solvent resistance increases markedly as indicated by the change in time required to achieve solvent resistance from days to hours to minutes.

This example illustrates that maintaining the temperature of the coated substrate at a temperature of 200° F. for as little as 2 minutes was sufficient to produce a highly solvent resistant coating as indicated by a decrease in absorbance from a reading of more than 2 to less than 1. Conditioning at temperatures significantly higher than 200° F., i.e., 240° F. and 280° F., did not further reduce the time to obtain complete solvent resistance. Furthermore, temperatures above about 250° F. produce deleterious effects on polyvinylidene chloride copolymers.

EXAMPLE 5

The shiny side of aluminum foil was coated with about 0.3 pound of a suitable adhesive per 3,000 square feet of foil. The adhesive coated foil was then dried and coated separately with about 4 pounds per 3,000 square feet of foil with each of the following coating compositions: Coating Composition A, Coating Composition C, Coating Composition D made from, on a monomer weight basis, 92 percent vinylidene chloride, 5.5 percent methyl acrylate, and 2.5 percent acrylonitrile, and polyvinylidene chloride coating compositions commercially available under the trade names Daran 210 and Daran 220 respectively, believed to contain more than 80 weight percent of polymer units derived from vinylidene chloride. These coated substrates were conditioned in accordance with the conditions set forth in Table 5. Solvent resistance was tested by applying acetone to the polyvinylidene chloride coated foil and then allowing the acetone to evaporate off slowly. The extent of solvent attack was visually observed and assigned the letter values indicated below:

| E (Excellent) | : | No visible effect of acetone attack. |
| G (Good) | : | Very slight haze—hardly noticeable. |
| M (Moderate) | : | Light to moderate haze. |
| F (Fair) | : | Heavy haze—definite whiteness. |
| P (Poor) | : | Solid white in areas exposed to |

The results of this test are summarized in the following table.

TABLE 5

| Conditioning | | Solvent sensitivity | | | | |
|---|---|---|---|---|---|---|
| | | Daran 210 | Daran 220 | Coating comp. | | |
| Time | Temperature | | | C | A | D |
| Immediate | Ambient (72° F.) | P | P | P | P | P |
| 24 hrs | do | P | P-F | P | P | P |
| 48 hrs | do | P-F | P-F | P | P | P |
| 7 days | do | F | M | M | P | M |
| 10 days | do | M | M-G | G | F | G-E |
| 14 days | do | G | E | E | M | E |
| 5 hrs | 100° F | F | F-M | F | P | M |
| 8 hrs | 100° F | M | M | G | P | E |
| 16 hrs | 100° F | E | E | E | E | E |
| 24 hrs | 100° F | E | E | E | E | E |
| 30 hrs | 100° F | | E | E | E | |
| 36 hrs | 100° F | | E | E | E | |
| ½ hr | 130° F | M | M | M | F | M |
| 1 hr | 130° F | G | E | E | E | E |
| 2 hrs | 130° F | E | E | E | E | E |
| 4 hrs | 130° F | E | E | E | E | E |

This example demonstrates that for most of the compositions tested, complete solvent resistance, indicated by a rating of "G" or "E," is usually obtained at the following temperatures for the indicated times:

| TEMPERATURE | 72° F. | 100° F. | 130° F. |
|---|---|---|---|
| TIME | 10 Days | 16 Hrs. | 1 Hr. |

EXAMPLE 6

Two sets of three samples each of solid bleached sulfate board with a print coating on the reverse side were coated with Coating Composition B and Coating Composition C respectively. The polyvinylidene chloride coated board samples were conditioned at various temperatures and times to develop blocking resistance. The conditioned samples of coated substrates were then tested for blocking properties by pressing them to their own reverse sides at a pressure of about 200 pounds per square inch for about 20 minutes. When no sticking occurred, the conditioning times were determined. The results of the blocking test are summarized in Table 6.

TABLE 6

| Coating Composition | CONDITIONING Time to Develop Freedom from Blocking | Temperature °F. |
|---|---|---|
| B | 11.0 Days | 80° F. |
|   | 1.2 Days | 100° F. |
|   | 3.1 Days | 120° F. |
| C | 16.8 Hours | 80° F. |
|   | 2.4 Hours | 100° F. |
|   | 21.6 Minutes | 120° F. |

The above results indicate that there are a variety of combinations of conditioning times and temperatures that will produce a polyvinylidene chloride coated substrate that will not block.

EXAMPLE 7

Polyvinylidene chloride coated nylon was prepared according to the procedure described in Example 1 using Coating Composition A. A plurality of separate samples of the coated nylon were conditioned at 80° F., 100° F., and 130° F. respectively for various periods of time. Thereafter, the kinetic coefficient of friction was determined on a slip tester wherein each sample was pulled at the rate of 2 feet per minute under the face of a polished stainless steel block having a weight of 1,000 grams. The block is attached to a scale, and the coefficient of friction was determined by moving the coated nylon in a direction opposite to the direction that the applicator was moved in applying the coating. This procedure was conducted on three separate samples for each time interval. A high and low value was recorded for each sample, and these six readings were used to obtain an average coefficient of friction. These averages are reported in Table 7.

TABLE 7

| Coating Composition | Conditioning Time (Days) | Temperature °F. | Coefficient of Friction |
|---|---|---|---|
| A | 0 | 80° F. | 0.42 |
|   | 3 | 80° F. | 0.28 |
|   | 8 | 80° F. | 0.25 |
|   | 0 | 100° F. | 0.39 |
|   | 1 | 100° F. | 0.27 |
|   | 3 | 100° F. | 0.25 |
|   | 0 | 130° F. | 0.38 |
|   | 0.2 (4.8 Hrs.) | 130° F. | 0.30 |
|   | 0.3 (7.2 Hrs.) | 130° F. | 0.25 |

This example demonstrates that a satisfactory coefficient of friction reading (ASTM Method D1894-63) of 0.25 is attained by conditioning a polyvinylidene coated substrate for 8 days at 80° F., or for 3 days at 100° F., or for only 7 hours at a temperature of 130° F.

It will thus be seen that the invention accomplishes its objects and while it has been herein disclosed by reference to the details of preferred embodiments, it is to be understood that such disclosure is intended in an illustrative, rather than a limiting sense, as it is contemplated that various modifications in the materials and method steps will readily occur to those skilled in the art, within the spirit of the invention and the scope of the appended claims.

All percentages given herein are by weight unless otherwise indicated.

I claim:

1. A process for improving the surface properties of a vinylidene chloride copolymer which process comprises heat treating the copolymer at a temperature in the range of form about 100° to about 250° F. for a period of time of at least about 2 minutes until the solvent resistance of the polymer increases and the copolymer becomes free from blocking, and laminating said heat treated copolymer to a substrate by applying a solvent-containing adhesive to the copolymer in which the solvent is deleterious to the copolymer in the absence of prior heat treating.

* * * * *

UNITED STATES PATENT OFFICE
CERTIFICATE OF CORRECTION

Patent No. 3,645,824   Dated February 29, 1972

Inventor(s) Richard A. Patton

It is certified that error appears in the above-identified patent and that said Letters Patent are hereby corrected as shown below:

Column 2, line 6, delete "possess" and substitute --poses--.

In Example I, column 3, line 6, delete "the" and substitute --then--.

In Example 3, column 5, line 66, delete "attacked" and substitute --attack--.

In Example 4, column 6, line 40, delete "db" and substitute --DB--; and line 43, after "5,500A" insert --°--.

In Example 5, column 8, line 35, after "Solid white in areas exposed to" add --the acetone--.

In Table 6, column 9, line 14, delete "3.1 Days" and substitute --3.1 Hours--; and line 22, delete "temperat$res" and substitute --temperatures--.

In Table 7, column 10, line 34, delete "form" and substitute --from--.

Signed and sealed this 25th day of July 1972.

(SEAL)
Attest:

EDWARD M. FLETCHER, JR.
Attesting Officer

ROBERT GOTTSCHALK
Commissioner of Patents